United States Patent
Robinson

[19]

[11] Patent Number: 6,119,843
[45] Date of Patent: Sep. 19, 2000

[54] RETRACTABLE STOP ASSEMBLY

[76] Inventor: Brian Owen Robinson, 302 N. Grove, Ypsilanti, Mich. 48198

[21] Appl. No.: 09/243,497

[22] Filed: Feb. 3, 1999

[51] Int. Cl.[7] .................................................. B65G 13/00
[52] U.S. Cl. ...................................... 193/35 A; 198/345.3
[58] Field of Search ..................... 193/32, 35 A, 193/40; 198/343.1, 345.1, 345.3

[56] References Cited

U.S. PATENT DOCUMENTS

| | | |
|---|---|---|
| 2,350,034 | 5/1944 | Herrington . |
| 2,436,941 | 3/1948 | Sendoykas . |
| 3,116,058 | 12/1963 | Blatt . |
| 3,347,542 | 10/1967 | Mericle, Jr. . |
| 3,545,050 | 12/1970 | Blatt et al. . |
| 3,696,756 | 10/1972 | Elmore, et al. . |
| 3,970,180 | 7/1976 | Schlottmann et al. . |
| 4,184,579 | 1/1980 | Kantarian et al. . |
| 4,331,326 | 5/1982 | Strouss . |
| 4,397,386 | 8/1983 | Kampf . |
| 4,469,138 | 9/1984 | Satoh . |
| 4,496,138 | 1/1985 | Blatt . |
| 4,576,367 | 3/1986 | Horn et al. . |
| 4,637,597 | 1/1987 | McPherson et al . |
| 4,662,500 | 5/1987 | Agnew . |
| 4,703,843 | 11/1987 | Dixon . |
| 4,723,767 | 2/1988 | McPherson et al. . |
| 4,732,258 | 3/1988 | Burgess, Jr. ........................ 198/345.3 |
| 5,118,088 | 6/1992 | Sawdon . |
| 5,165,670 | 11/1992 | Sawdon . |
| 5,168,976 | 12/1992 | Kettelson ............................ 198/345.1 |
| 5,171,001 | 12/1992 | Sawdon . |
| 5,211,276 | 5/1993 | Clopton .............................. 198/345.3 |
| 5,213,189 | 5/1993 | Agnoff ................................. 193/35 A |
| 5,609,239 | 3/1997 | Schlecker . |
| 5,676,235 | 10/1997 | Sam et al. ........................... 193/35 A |
| 5,860,505 | 1/1999 | Metzger .............................. 198/345.1 |
| 5,890,577 | 4/1999 | Faisant ................................. 193/35 A |

Primary Examiner—David H. Bollinger
Assistant Examiner—Gene O. Crawford
Attorney, Agent, or Firm—Brooks & Kushman P.C.

[57] ABSTRACT

A stop assembly includes a drive arm and a stop arm with a backside configured to direct a reaction force applied by the stop arm to the drive arm when the stop arm engages a workpiece. The drive arm pivots between pre-locked and unlocked positions in response to movement of the reciprocatable member between extended and retracted positions. The motion range includes a locked position between the pre-locked and unlocked positions. The stop arm is pivotally mounted to the body and has a front side for engaging a workpiece, while the backside engages the drive arm. The stop arm backside is configured such that the reaction force has a component normal to the drive arm plane when the drive arm is between the pre-locked and locked positions, and such that the reaction force is substantially coplanar with the drive arm plane when the drive arm is in the locked position.

13 Claims, 4 Drawing Sheets

RETRACTABLE STOP ASSEMBLY

TECHNICAL FIELD

The present invention relates to power operated retractable stop assemblies.

BACKGROUND ART

The use of industrial retractable stop products has become wide spread, due at least in part to high demands in the automotive and heavy equipment industries. Conventionally, the retractable stops are powered by a linear actuator such as an air or hydraulic cylinder, or a solenoid actuator.

A power operated retractable stop assembly typically includes a reciprocatable rod member driven by the linear actuator, and an assembly body secured to the driving cylinder. Some of these existing assemblies, such as those described in U.S. Pat. No. 4,184,579, utilize a stop lever for stopping and releasing loads traveling on a conveyor. In such an assembly, a blocker leg is used to prevent pivoting of the stop arm causing an uncushioned "hard" stop of loads traveling on the conveyor, when the blocker leg is in the blocking position.

Other existing assemblies attempt to provide a cushioned stop by using cylinder pressure to hold the stop arm in the blocking position. However, assemblies such as these may be disadvantageous in that there is no guarantee of a stop, and a heavy load may deflect the stop lever against the biasing cylinder pressure and continue right past the retractable stop without stopping. Sometimes, assemblies utilize a first mechanism for actuating and deactuating the stop and utilize a separate shock absorber mechanism, such as the assembly described in U.S. Pat. No. 5,168,976.

Although these existing retractable stop assemblies that provide a "hard" stop and those assemblies that attempt to provide a cushioned stop by using cylinder pressure have been used in many applications that have been commercially successful, these assemblies have disadvantages. As in some applications it may be desirable to provide a cushioned stop, assemblies providing a "hard" stop without any cushion may not be desired. Further, although a cushion may be desirable in some applications, because such assemblies cannot guarantee a stopping of the load after the cushion, these assemblies too may be undesirable. Further, assemblies utilizing a separate shock absorber mechanism are complex and costly.

For the forgoing reasons, there is a need for an improved power operated retractable clamp assembly.

DISCLOSURE OF INVENTION

It is, therefore, an object of the present invention to provide a power operated retractable stop assembly with integral cushion and stopping mechanisms.

In carrying out the above object, other objects and features of the present invention, a power operated retractable stop assembly is provided. The assembly comprises a body, a reciprocatable member, a drive arm, and a stop arm. The reciprocatable member extends into the body and is adapted to engage a driving means such as a cylinder. The reciprocatable member is driveable between an extended position and a retracted position. The drive arm is pivotally mounted to the body and drivingly connected to the reciprocatable member such that the drive arm is pivotable about a drive axis. The drive arm is pivotable over a motion range between a pre-locked position and an unlocked position in response to movement of the reciprocatable member. The motion range includes a locked position between the pre-locked position and the unlocked position. The drive arm has a central axis passing through the drive axis to define a drive arm plane that pivots with the drive arm.

The stop arm is pivotally mounted to the body such that the stop arm is pivotable about a stop axis. The stop arm has a front side for engaging a workpiece and a back side for engaging the drive arm. The stop arm is positioned to apply a reaction force to the drive arm in response to receiving a workpiece force on the stop arm front side from a workpiece.

The stop arm backside is configured such that the reaction force has a component normal to the drive arm plane when the drive arm is between the pre-locked position and the locked position. The normal component of the reaction force urges the drive arm toward the locked position. Further, the stop arm backside is configured such that the reaction force is substantially coplanar with the drive arm plane when the drive arm is in the locked position to cause the drive arm to remain at the locked position.

In a preferred embodiment, the assembly further comprises a positioning guide defined by the stop assembly body. The positioning guide is located near the stop arm and has a sloped portion that directs an oncoming workpiece to a portion of the stop arm that is sufficiently spaced from the stop axis. Thus, spacing is sufficient to apply a moment to the stop arm due to the workpiece force that is sufficient to overcome the driving means and results in a cushion stopping of the drive arm in the locked position. Once in the locked position, the drive arm is locked due to the reaction force being substantially coplanar with the drive arm plane.

Preferably, the drive arm and the reciprocating member are configured such that the drive arm pre-locked position corresponds to the reciprocatable member retracted position, and the drive arm unlocked position corresponds to the reciprocatable member extended position. Alternatively, the drive arm and the reciprocating member may be configured such that the drive arm pre-locked position corresponds to the reciprocatable member extended position, and the drive arm unlocked position corresponds to the reciprocatable member retracted position.

Preferably, the assembly further comprises a cam roller located at the drive arm end and positioned to engage the stop arm backside. The roller has an axis of rotation that is substantially parallel to the drive axis and is substantially coplanar with the drive arm plane. Alternatively, the roller may be located at the stop arm backside and positioned to engage the drive arm end.

Further, in carrying out the present invention, a power operated retractable stop assembly comprises a body, a piston and cylinder assembly, a reciprocatable member, a drive arm, and a stop arm. The reciprocatable member extends into the body and is connected to the piston and cylinder assembly. The reciprocatable member is driveable by the piston and cylinder assembly over the a stroke range between an extended position and a retracted position. The stop arm backside is configured such that the reaction force has a component normal to the drive arm plane when the drive arm is between the pre-locked position and the locked position. Further, the stop arm backside is configured such that the reaction force is substantially coplanar with the drive arm plane when the drive arm is in the locked position to cause the drive arm to remain at the locked position.

The advantages associated with embodiments of the present invention are numerous. For example, power operated retractable stop assemblies made in accordance with the present invention use the driving means which may be a piston and cylinder assembly to provide a cushion when stopping a load. The amount of cushion may be selected by choosing appropriate cylinder operating pressure and appropriate lever arm distances between pivot points and the force application points. Further, stop assemblies made in accordance with the present invention, in addition to providing cushioning, provide a "hard" stop at the end of the cushion zone. That is, during cushioning, reaction force applied to the drive arm has a component normal to the drive arm plane; but, once the drive arm reaches the locked position, the reaction force is coplanar with the drive arm plane. As such, once the stop assembly has locked, the driving means (such as a piston and cylinder assembly) is not needed to maintain the locked position. Although finite cylinder pressure holding force may be used to resist/cushion movement to the locked position, alternatively, a hydraulic cylinder with a pressure relief valve may be used.

The above object, and other objects, features and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
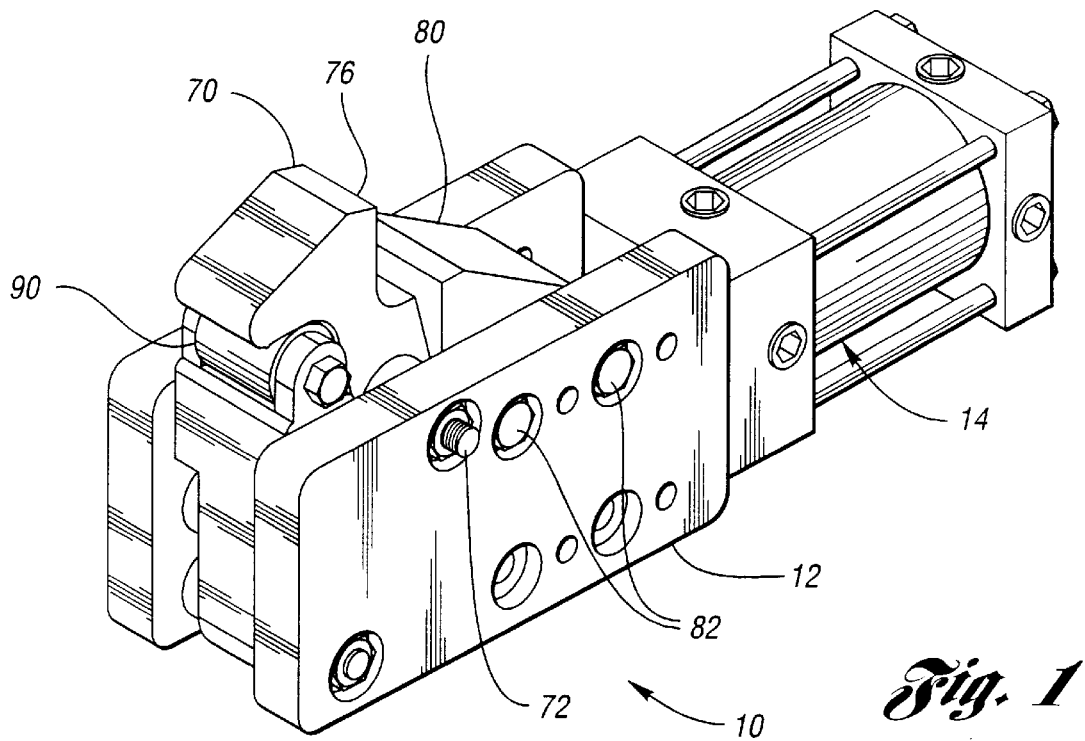
FIG. 1 a perspective view of a power operated retractable stop assembly made in accordance with the present invention.
Figure 2:
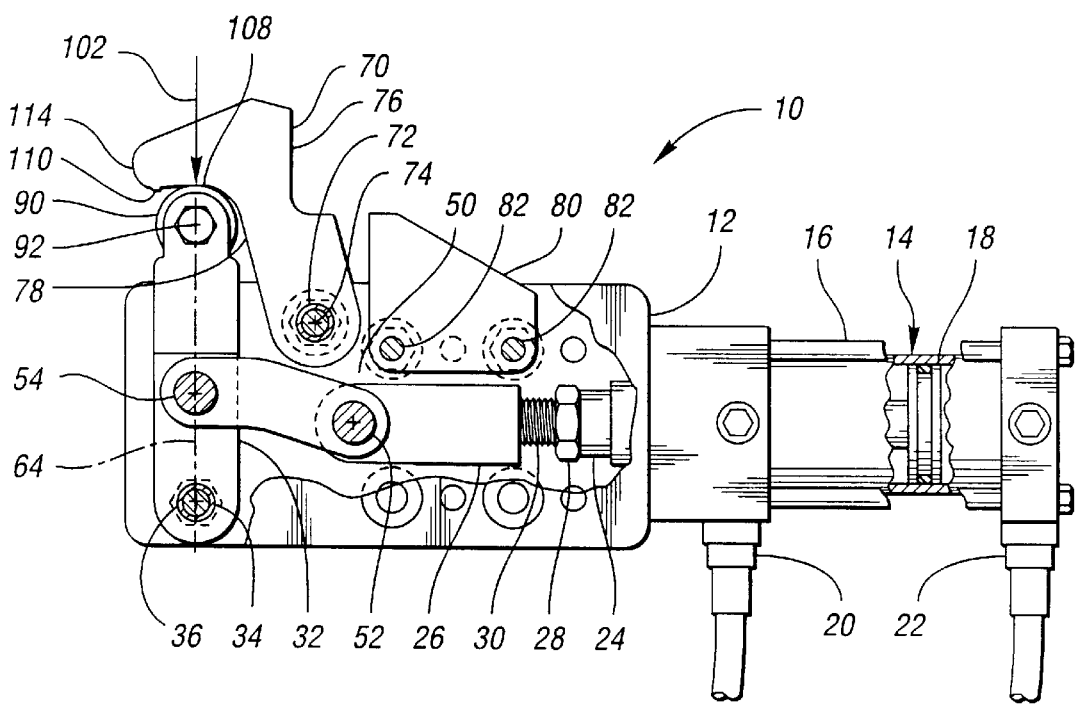
FIG. 2 is a side elevation, partially in section, of the stop assembly of FIG. 1, showing the stop assembly in the locked position.
Figure 3:
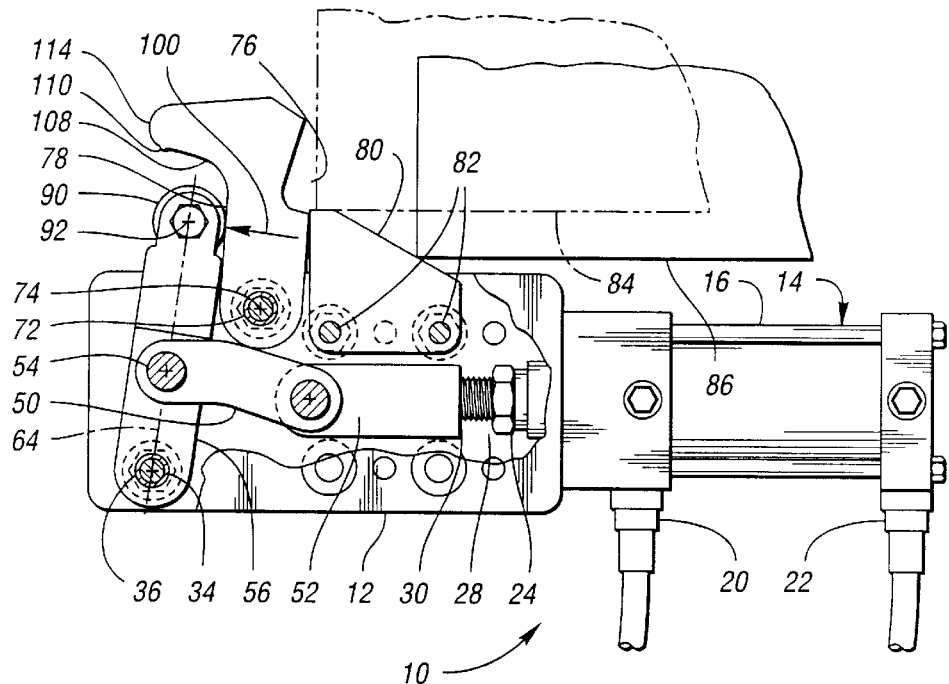
FIG. 3 is a side elevation, partially in section, of the stop assembly of FIG. 1, showing the stop assembly in the pre-locked position.
Figure 4:
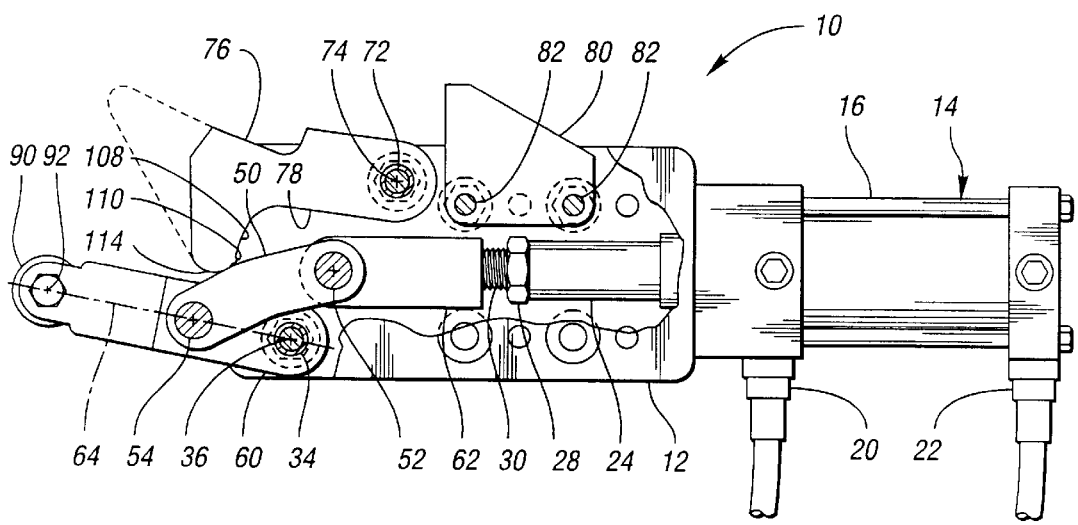
FIG. 4 is a side elevation, partially in section, of the stop assembly of FIG. 1, showing the stop assembly in the unlocked position.
Figure 5:
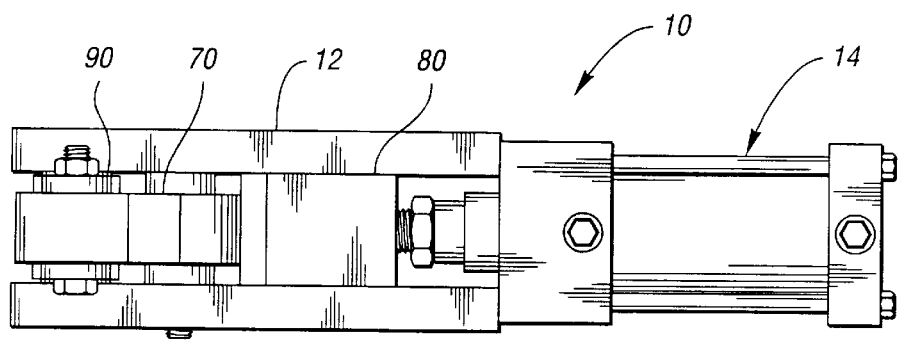
FIG. 5 is a top view of the stop assembly of FIG. 1, showing the stop assembly in the locked position.
Figure 6:
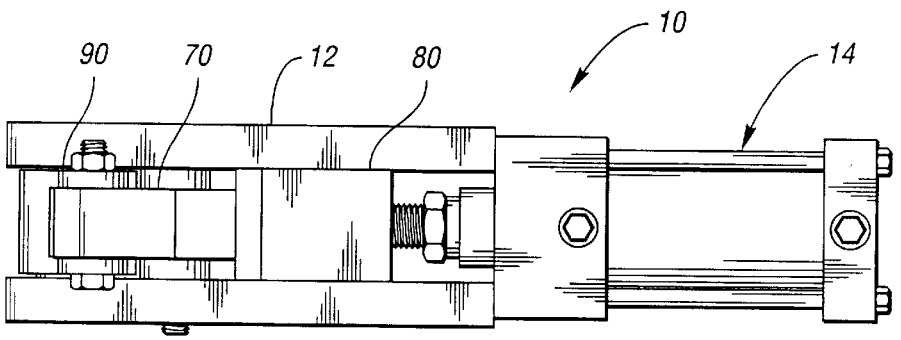
FIG. 6 is a top view of the stop assembly of FIG. 1, showing the stop assembly in the pre-locked position.
Figure 7:
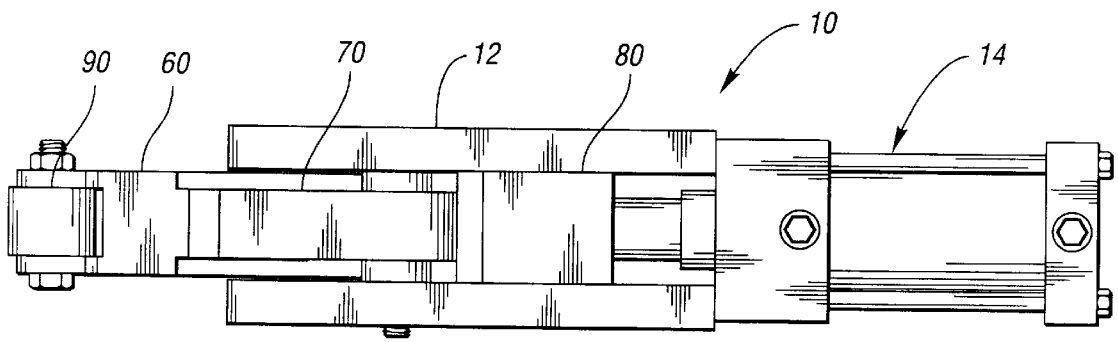
FIG. 7 is a top view of the stop assembly of FIG. 1, showing the stop assembly in the unlocked position.
Figure 8:
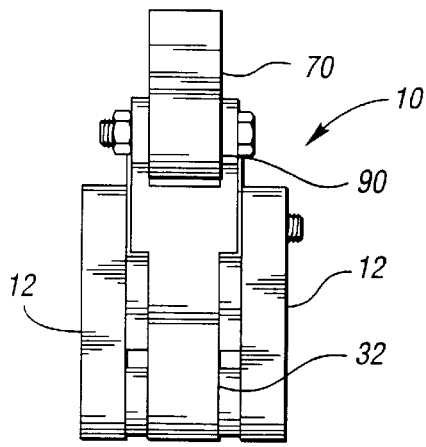
FIG. 8 is an end view of the stop assembly of FIG. 1, showing the stop assembly in the locked position.
Figure 9:
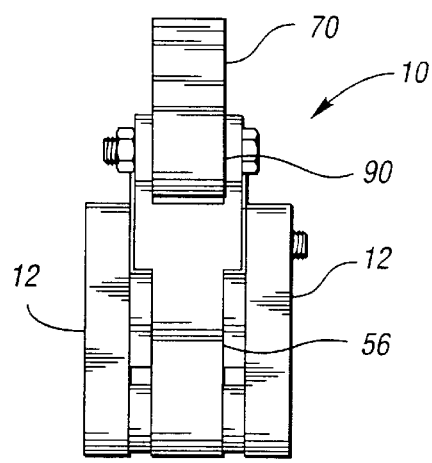
FIG. 9 is a end view of the stop assembly of FIG. 1, showing the stop assembly in the pre-locked position.
Figure 10:
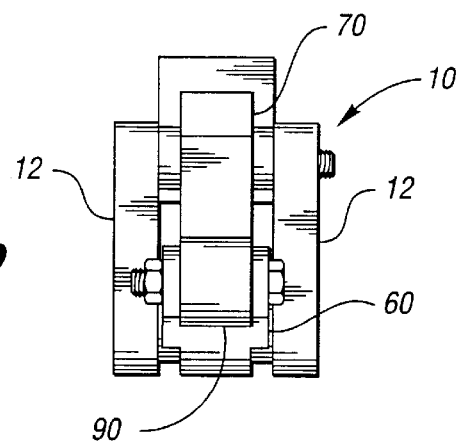
FIG. 10 is an end view of the stop assembly of FIG. 1, showing the stop assembly in the unlocked position.

Referring to FIGS. 1 through 10 which illustrate a power operated retractable stop assembly of the present invention, and primarily to FIGS. 2–4 which are partially in section, the preferred embodiment of the stop assembly is generally indicated at 10. Stop assembly 10 has a body composed of sides 12. A driving means engages body 12. A suitable driving means is a piston and cylinder assembly, generally indicated at 14. Piston and cylinder assembly 14 includes a cylinder 16 in which a piston 18 is driven. Piston and cylinder assembly 14 has suitable connectors 20 and 22 for connecting to a source. Piston and cylinder assembly 14 forms a linear actuator and may be either powered by air (or other gas) or hydraulic media. An air powered cylinder is suitable for providing a cushioning zone due to the compressability of gas. Alternatively, a hydraulic cylinder with a pressure relief valve may be employed to provide a cushioning zone. Of course, it is appreciated that compressed air may be preferred because air sources are generally cheaper, and many times are already present at a work site.

A reciprocatable member such as push rod 24 is driven by piston and cylinder assembly 14 and extends into stop body sides 12. Reciprocatable member 24 is driveable by piston and cylinder assembly 14 over a stroke range between an extended position and a retracted position as described further, below. Reciprocatable member 24 includes an end 26 that is preferably adjustably secured by nut 28 and threaded portion 30 of end 26. The nut and threads arrangement allows some adjustment of the extended and retracted positions for reciprocatable member 24, which is preferred, but not required.

A drive arm 32 is pivotally mounted to body 12. A pin and bearing arrangement 34, preferably of side thrust bearings to prevent side-to-side sliding, is used to mount drive arm 32 to body 12. Drive arm 32 is pivotal about drive axis 36. Drive arm 32 is connected to reciprocating member end 26 by intermediate link 50. Link 50 pivotally connects to member end 26 by pin 52, and connects to drive arm 32 with pin 34. As pin arrangements 52 and 54 will move with respect to body 12 during operation, pin arrangements 52 and 54 only extend within the clamped sides and preferably are needle bearings on hardened shafts. Accordingly, pin and bearing arrangement 34 and drive arm 32 are affixed to clamp body 12.

Drive arm 32 is pivotable about drive axis 36 over a motion range between a pre-locked position (reference numeral 56, FIG. 3) and an unlocked position (reference numeral 60, FIG. 4). Further, the motion range includes a locked position (reference numeral 32, FIG. 2) between the unlocked and pre-locked positions. The reciprocatable member is in the retracted position 58 (FIG. 3) when the drive arm is in the pre-locked position 56 (FIG. 3). The reciprocatable member is in the extended position 62 (FIG. 4) when the drive arm is in the unlocked position 60 (FIG. 4). The reciprocatable member is at an intermediate position 26 (FIG. 2) when the drive arm is in the locked position 32 (FIG. 2).

As described above, the drive arm moves over its motion range in response to movement of the reciprocatable member. Drive arm 32 has a central axis 64 passing through drive axis 36 to define a drive arm plane that pivots with the drive arm. The drive arm plane is the plane defined by central axis 64 and pivot axis 36 that, when viewing FIG. 2, is perpendicular to the page. The drive plane rotates as the drive arm rotates, which may be observed by referring to FIG. 3. In FIG. 3, the drive plane is again perpendicular to the page, but has rotated slightly clockwise from the position of the drive plane of FIG. 2.

Figure 11:
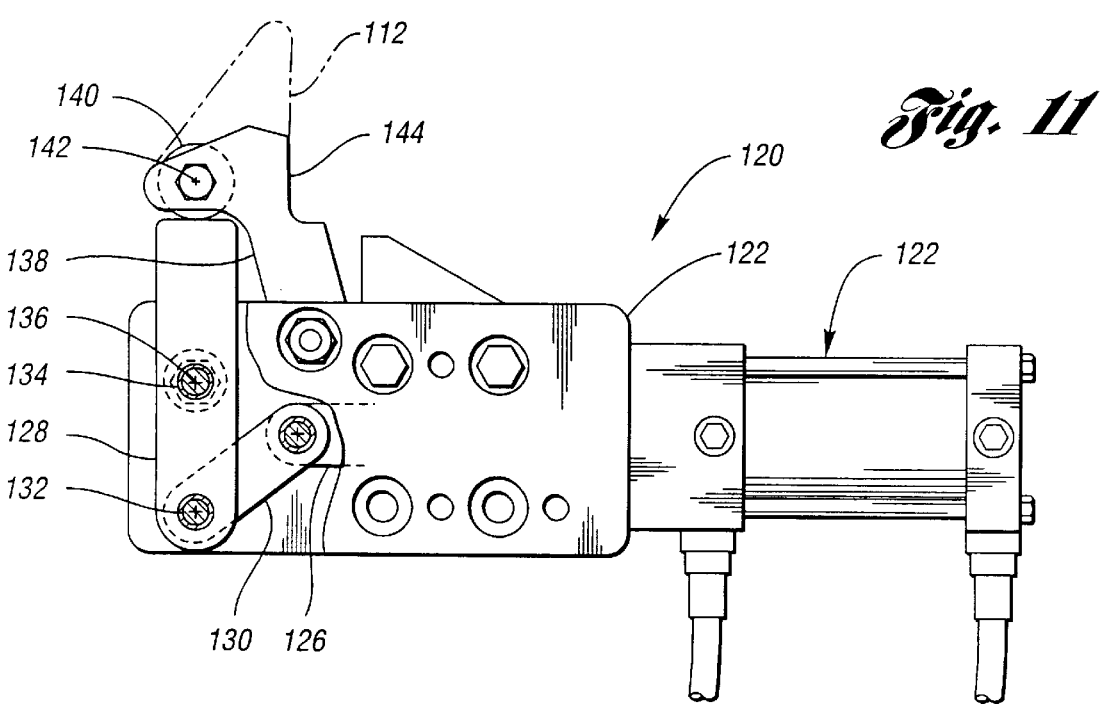
FIG. 11 is an alternative embodiment for a stop assembly of the present invention, showing a cam roller on the clamp arm and an alternative arrangement for connecting the reciprocating member to the drive arm.

Of course, as mentioned previously, although in a preferred embodiment of the present invention, the extended reciprocating member corresponds to the unlocked position for the drive member, and the retracted reciprocating member corresponds to the pre-locked position for the drive member, an alternative arrangement is contemplated and is shown in FIG. 11, later described below. In particular, it is preferred that the retracted reciprocatable member corresponds to the pre-locked position such that when the drive member is urged to the locked position, maximum available force may be applied to piston 18 within piston and cylinder assembly 14 to unlock the assembly. That is, in a piston and cylinder assembly of a particular operating pressure, more force may be applied when extending piston rod 24 than when retracting piston rod 24. This is because the attachment of piston rod 24 to piston 18 takes up some of the available surface area and resultantly reduces the amount of force available to move piston 18 towards the opposite side of where piston rod 24 is attached thereto for a given operating pressure.

Stop assembly 10 also includes a stop arm 70. Stop arm 70 is affixed to body 12 by pin and bearing assembly 72, which extends through clamp body 12 and which preferably includes side thrust bearings to prevent side-to-side sliding. Stop arm 70 is pivotable about a stop axis 74. Stop arm 70 has a front side 76 for engaging a workpiece, such as workpiece 84 (FIG. 3). Stop arm 70 has a backside 78 for engaging drive arm 32.

Based upon a variety of design parameters, such as cylinder operating pressure or pressure relief valve configuration, it is usually desirable that when a workpiece contacts stop arm 70, that workpiece contacts stop arm 70 at a point sufficiently spaced from pivot axis 72. A sufficient spacing from pivot axis 72 assures that a reasonable moment is applied to stop arm 70 to push drive arm 32 over the cushioning zone against the bias of piston and cylinder assembly 14. Of course, positioning guide 80 is preferred but not required. Positioning guide 80 is part of body assembly 12 and is affixed to the stop sides by bolts 82.

By appropriately implementing a positioning guide, it is to be appreciated that, as best shown in FIG. 3, workpiece 84 contacts stop arm 70 at a contact point sufficiently spaced from pivot axis 74. The sloped portion of the positioning guide, which is located near stop arm 70, directs an incoming workpiece (shown in phantom at 86, FIG. 3) to a contact point sufficiently spaced from stop axis 74. As such, a cushion stopping of the drive arm in the locked position occurs. Stop arm 70 is positioned to apply a reaction force to drive arm 32 in response to receiving a workpiece force on front side 76 from a workpiece 84.

As best shown in FIG. 3, stop arm backside 78 is configured such that a reaction force applied by stop arm backside 78 to drive arm 56 in response to the force of workpiece 84 on stop arm 70 has a component 100 that is normal to the drive arm plane when the drive arm is between the pre-locked position and the locked position. Because drive axis 36 lies in the drive arm plane, forces normal to the drive arm plane urge the drive arm toward the locked position. As such, configuring stop arm backside 78 such that the reaction force has a component normal to the drive arm plane when the drive arm is between the pre-locked position and the locked position, causes the drive arm to be urged to the locked position, whenever a workpiece contacts stop 70 and the drive arm is between the pre-locked position 56 and the locked position 32.

As best shown in FIG. 2, when the drive arm reaches the locked position 32, the configuration of stop arm backside 78 causes the reaction force 102 applied by stop arm backside 78 to drive arm 32 to be substantially coplanar with the drive arm plane. Because drive arm axis 36 lies in the drive arm plane, substantially coplanar reaction forces are opposed by pin and bearing assembly 34, and do not cause drive arm 32 to rotate out the locked position.

Advantageously, pin and bearing assembly 34 hold the stop assembly in the locked position against the force of any load or workpiece, and if desired, piston and cylinder assembly 14 need not be relied on to maintain the locked position for the retractable stop. After drive arm 32 and stop arm 70 have remained in the locked positions for a desired amount of time, piston and cylinder assembly 14 may be actuated to urge the drive arm to the unlocked position 60 (FIG. 4), allowing stop arm 70 to pivot and allow workpiece 84 to pass.

Advantageously, embodiments of the present invention provide a cushioning zone between the pre-locked and locked positions in which the amount of cushion may be determined by selecting appropriate lever arm lengths, pivot point positions, utilization of a positioning guide, and selection of actuator operating pressures or pressure relief valve configuration. Further, it is to be appreciated that embodiments of the present invention, after the cushioning zone, provide a "hard" stop. Advantageously, the hard stop directs all force from the workpiece in a direction coplanar with the drive arm plane such that this reaction force is received by pin and bearing assembly 34 almost in its entirety.

In a preferred embodiment of the present invention, a cam roller 90 is located at the end of the drive arm and is positioned to engage stop arm backside 78. Roller 90 has an axis of rotation 92 that is substantially parallel to drive axis 36 and is substantially coplanar with the drive arm plane. Of course, alternatively, the roller may be provided on stop arm 70, instead, if desired, but it is preferred that roller 90 be located at the end of the drive arm. Preferably, in compressible gas type cylinder embodiments, backside surface 78 includes a portion 108 that is configured to follow a radius from the drive arm axis 36 that extends to the contact point of roller 90 and backside surface 78. As such, the drive arm may slightly bounce or overshoot as the stop arm moves to the locked position without disturbing the stop arm. A small bump 110 marks the end of the overshoot roll zone. In a construction using an air cylinder (to allow gas compressability), the inventor has observed bounce or overshoot of about 0.50 in (1.3 cm) to 0.75 in (1.9 cm). As such, in that example, a radiused portion (overshoot roll zone) that extends over an arc length of about 0.75 in (1.9 cm) is suitable to allow recovery from reverberations in the air column.

With reference now to FIG. 11, several alternatives for implementing specific features of the present invention are described. A power operated retractable stop assembly having several alternative features is generally indicated at 120. Assembly 120 has a body 122 connected to a piston and cylinder assembly 124. Reciprocatable member 126 and drive arm 128 are configured such that the extended position for retractable member 126 corresponds to the pre-locked position for a drive arm 128, and the retracted position for reciprocatable member 126 corresponds to the unlocked position for the drive arm 128. This is achieved by connecting reciprocatable member 126 to drive arm 128 with a link 130 to a pivot pin connection 132 that is on an opposite side of pin and bearing assembly 134 and pivot axis 136 than stop arm backside 138. In another alternative feature, a roller 140 having an axis of rotation 142 is connected to stop arm 144, as suggested previously. Further, an alternative, long stop arm is shown in phantom at 112. Further, preferably in all embodiments, radiused portion 114 on the stop arm rides on the drive arm to lift the stop arm from the unlocked position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A power operated retractable stop assembly comprising:
   a body;
   a reciprocatable member extending into the body and adapted to engage a driving means, the reciprocatable member being driveable between an extended position and a retracted position;
   a drive arm pivotally mounted to the body and drivingly connected to the reciprocatable member such that the drive arm is pivotable about a drive axis over a motion range between a pre-locked position and an unlocked position in response to movement of the reciprocatable member, the motion range including a locked position between the pre-locked position and the unlocked position, and the drive arm having a central axis passing through the drive axis to define a drive arm plane that pivots with the drive arm; and
   a stop arm pivotally mounted to the body such that the stop arm is pivotable about a stop axis, the stop arm having a front side for engaging a workpiece and a back side for engaging the drive arm, the stop arm being positioned to apply a reaction force to the drive arm in response to receiving a workpiece force on the stop arm front side from a workpiece,
   wherein the stop arm back side is configured such that the reaction force has a normal component that is perpendicular to the drive arm plane when the drive arm is between the pre-locked position and the locked position to move the drive arm toward the locked position by pivoting the drive arm and the drive arm plane, and such that the normal component diminishes as the drive arm pivots until the reaction force is substantially coplanar with the drive arm plane when the drive arm is in the locked position to cause the drive arm to remain at the locked position.

2. The stop assembly of claim 1 wherein the drive arm and the reciprocating member are configured such that the drive arm pre-locked position corresponds to the reciprocatable member extended position, and the drive arm unlocked position corresponds to the reciprocatable member retracted position, and wherein the drive arm locked position corresponds to an intermediate position for the reciprocatable member that is between the extended and retracted positions.

3. The stop assembly of claim 1 wherein the drive arm has an end, and the stop assembly further comprises:
   a cam roller located at the drive arm end and positioned to engage the stop arm back side, the roller having an axis of rotation that is substantially parallel to the drive axis and is substantially coplanar with the drive arm plane.

4. The stop assembly of claim 1 wherein the drive arm has end, and the stop assembly further comprises:
   a cam roller located at the stop arm back side and positioned to engage the drive arm end, the roller having an axis of rotation that is substantially parallel to the drive axis and is substantially coplanar with the drive arm plane.

5. A power operated retractable stop assembly comprising:
   a body;
   a piston and cylinder assembly;
   a reciprocatable member extending into the body and connected to the piston and cylinder assembly, the reciprocatable member being driveable by the piston and cylinder assembly over a stroke range between an extended position and a retracted position;
   a drive arm pivotally mounted to the body and drivingly connected to the reciprocatable member such that the drive arm is pivotable about a drive axis over a motion range between a pre-locked position and an unlocked position in response to movement of the reciprocatable member, the motion range including a locked position between the pre-locked position and the unlocked position, and the drive arm having a central axis passing through the drive axis to define a drive arm plane that pivots with the drive arm; and
   a stop arm pivotally mounted to the body such that the stop arm is pivotable about a stop axis, the stop arm having a front side for engaging a workpiece and a back side for engaging the drive arm, the stop arm being positioned to apply a reaction force to the drive arm in response to receiving a workpiece force on the stop arm front side from a workpiece,
   wherein the stop arm back side is configured such that the reaction force has a normal component that is perpendicular to the drive arm plane when the drive arm is between the pre-locked position and the locked position to move the drive arm toward the locked position by pivoting the drive arm and the drive arm plane, and such that the normal component diminishes as the drive arm pivots until the reaction force is substantially coplanar with the drive arm plane when the drive arm is in the locked position to cause the drive arm to remain at the locked position.

6. The stop assembly of claim 5 wherein the piston and cylinder assembly is operative to urge the drive arm toward the pre-locked position and oppose the reaction force normal component to the drive arm plane to cushion movement of the stop arm from the pre-locked position to the locked position, and the piston and cylinder assembly is further operative to urge the drive arm toward the unlocked position when the reaction force is substantially coplanar with the drive arm plane to cause the drive arm to move out of the locked position after remaining there for a desired amount of time and move to the unlocked position.

7. The stop assembly of claim 5 wherein the drive arm and the reciprocating member are configured such that the drive arm pre-locked position corresponds to the reciprocatable member extended position, and the drive arm unlocked position corresponds to the reciprocatable member retracted position, and wherein the drive arm locked position corresponds to an intermediate position for the reciprocatable member that is between the extended and retracted positions.

8. The stop assembly of claim 5 wherein the drive arm has an end, and the stop assembly further comprises:
   a cam roller located at the drive arm end and positioned to engage the stop arm back side, the roller having an axis of rotation that is substantially parallel to the drive axis and is substantially coplanar with the drive arm plane.

9. The stop assembly of claim 5 wherein the drive arm has end, and the stop assembly further comprises:
   a cam roller wheel located at the stop arm back side and positioned to engage the drive arm end, the roller having an axis of rotation that is substantially parallel to the drive axis and is substantially coplanar with the drive arm plane.

10. A power operated retractable stop assembly comprising:

a body;

a piston and cylinder assembly;

a reciprocatable member extending into the body and connected to the piston and cylinder assembly, the reciprocatable member being driveable by the piston and cylinder assembly over a stroke range between an extended position and a retracted position;

a drive arm pivotally mounted to the body and drivingly connected to the reciprocatable member such that the drive arm is pivotable about a drive axis over a motion range between a pre-locked position and an unlocked position in response to movement of the reciprocatable member, the motion range including a locked position between the pre-locked position and the unlocked position, and the drive arm having a central axis passing through the drive axis to define a drive arm plane that pivots with the drive arm;

a stop arm pivotally mounted to the body such that the stop arm is pivotable about a stop axis, the stop arm having a front side for engaging a workpiece and a back side for engaging the drive arm, the stop arm being positioned to apply a reaction force to the drive arm in response to receiving a workpiece force on the stop arm front side from a workpiece, wherein the stop arm back side is configured such that the reaction force has a component normal to the drive arm plane when the drive arm is between the pre-locked position and the locked position to urge the drive arm toward the locked position, and such that the reaction force is substantially coplanar with the drive arm plane when the drive arm is in the locked position to cause the drive arm to remain at the locked position; and a positioning guide defined by the stop assembly body, the positioning guide being located near the stop arm and having a sloped portion that directs an oncoming workpiece to a portion of the stop arm that is sufficiently spaced from the stop axis such that a moment applied to the stop arm due to the workpiece force is sufficient to overcome the driving means and results in a cushioned stopping of the drive arm in the locked position.

11. A power operated retractable stop assembly comprising:

a body;

a reciprocatable member extending into the body and adapted to engage a driving means, the reciprocatable member being driveable between an extended position and a retracted position;

a drive arm pivotally mounted to the body and drivingly connected to the reciprocatable member such that the drive arm is pivotable about a drive axis over a motion range between a pre-locked position and an unlocked position in response to movement of the reciprocatable member, the motion range including a locked position between the pre-locked position and the unlocked position, and the drive arm having a central axis passing through the drive axis to define a drive arm plane that pivots with the drive arm;

a stop arm pivotally mounted to the body such that the stop arm is pivotable about a stop axis, the stop arm having a front side for engaging a workpiece and a back side for engaging the drive arm, the stop arm being positioned to apply a reaction force to the drive arm in response to receiving a workpiece force on the stop arm front side from a workpiece, wherein the stop arm back side is configured such that the reaction force has a component normal to the drive arm plane when the drive arm is between the pre-locked position and the locked position to urge the drive arm toward the locked position, and such that the reaction force is substantially coplanar with the drive arm plane when the drive arm is in the locked position to cause the drive arm to remain at the locked position; and a positioning guide defined by the stop assembly body, the positioning guide being located near the stop arm and having a sloped portion that directs an oncoming workpiece to a portion of the stop arm that is sufficiently spaced from the stop axis such that a moment applied to the stop arm due to the workpiece force is sufficient to overcome the driving means and results in a cushioned stopping of the drive arm in the locked position.

12. A power operated retractable stop assembly comprising:

a body;

a reciprocatable member extending into the body and adapted to engage a driving means, the reciprocatable member being driveable between an extended position and a retracted position;

a drive arm pivotally mounted to the body and drivingly connected to the reciprocatable member such that the drive arm is pivotable about a drive axis over a motion range between a pre-locked position and an unlocked position in response to movement of the reciprocatable member, the motion range including a locked position between the pre-locked position and the unlocked position, and the drive arm having a central axis passing through the drive axis to define a drive arm plane that pivots with the drive arm; and a stop arm pivotally mounted to the body such that the stop arm is pivotable about a stop axis, the stop arm having a front side for engaging a workpiece and a back side for engaging the drive arm, the stop arm being positioned to apply a reaction force to the drive arm in response to receiving a workpiece force on the stop arm front side from a workpiece, wherein the stop arm back side is configured such that the reaction force has a component normal to the drive arm plane when the drive arm is between the pre-locked position and the locked position to urge the drive arm toward the locked position, and such that the reaction force is substantially coplanar with the drive arm plane when the drive arm is in the locked position to cause the drive arm to remain at the locked position, and wherein the drive arm and the reciprocating member are configured such that the drive arm pre-locked position corresponds to the reciprocatable member retracted position, and the drive arm unlocked position corresponds to the reciprocatable member extended position.

13. A power operated retractable stop assembly comprising:

a body;

a reciprocatable member extending into the body and connected to the piston and cylinder assembly, the reciprocatable member being driveable by the piston and cylinder assembly over a stroke range between an extended position and a retracted position;

a drive arm pivotally mounted to the body and drivingly connected to the reciprocatable member such that the drive arm is pivotable about a drive axis over a motion range between a pre-locked position and an unlocked position in response to movement of the reciprocatable member, the motion range including a locked position between the pre-locked position and the unlocked position, and the drive arm having a central axis passing through the drive axis to define a drive arm plane that pivots with the drive arm; and a stop arm pivotally mounted to the body such that the stop arm is pivotable about a stop axis, the stop arm having a front side for engaging a workpiece and a back side for engaging the drive arm, the stop arm being positioned to apply a reaction force to the drive arm in response to receiving a workpiece force on the stop arm front side from a workpiece, wherein the stop arm back side is configured such that the reaction force has a component normal to the drive arm plane when the drive arm is between the pre-locked position and the locked position to urge the drive arm toward the locked position, and such that the reaction force is substantially coplanar with the drive arm plane when the drive arm is in the locked position to cause the drive arm to remain at the locked position, and wherein the drive arm and the reciprocating member are configured such that the drive arm pre-locked position corresponds to the reciprocatable member retracted position, and the drive arm unlocked position corresponds to the reciprocatable member extended position.

* * * * *